(12) United States Patent
Grant et al.

(10) Patent No.: US 8,912,766 B2
(45) Date of Patent: Dec. 16, 2014

(54) SYSTEM AND METHOD FOR DETERMINING POLE SHIFT

(71) Applicant: General Electric Company, Schenectady, NY (US)

(72) Inventors: John Wesley Grant, Gardnerville, NV (US); Raymond Verle Jensen, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 13/763,612

(22) Filed: Feb. 8, 2013

(65) Prior Publication Data
US 2014/0225576 A1 Aug. 14, 2014

(51) Int. Cl.
*H02P 9/00* (2006.01)

(52) U.S. Cl.
USPC ............................................. 322/44; 322/99

(58) Field of Classification Search
USPC ..................... 322/20, 37, 59, 99, 44; 310/178
See application file for complete search history.

(56) References Cited

U.S. PATENT DOCUMENTS

| | | | |
|---|---|---|---|
| 5,606,247 A * | 2/1997 | Sutrina | 322/50 |
| 5,769,545 A | 6/1998 | Bently et al. | |
| 6,049,197 A * | 4/2000 | Caamano | 322/89 |
| 6,142,672 A | 11/2000 | Bently et al. | |
| 6,323,573 B1 * | 11/2001 | Pinkerton | 310/178 |
| 6,434,512 B1 | 8/2002 | Discenzo | |
| 7,069,173 B2 | 6/2006 | Grant et al. | |
| 7,516,679 B2 | 4/2009 | Bell et al. | |
| 7,656,135 B2 * | 2/2010 | Schram et al. | 322/59 |
| 7,762,153 B2 | 7/2010 | Hoyte et al. | |
| 7,808,233 B2 | 10/2010 | Jensen | |
| 7,818,139 B2 | 10/2010 | Jensen | |
| 7,834,618 B2 | 11/2010 | Moura et al. | |
| 8,076,909 B2 * | 12/2011 | Diatzikis et al. | 322/99 |
| 8,344,741 B2 | 1/2013 | Sheikman et al. | |
| 8,378,645 B2 * | 2/2013 | Hobelsberger et al. | 322/99 |
| 8,482,302 B2 * | 7/2013 | Suckling et al. | 324/662 |
| 2008/0164697 A1 | 7/2008 | Schram et al. | |

FOREIGN PATENT DOCUMENTS

EP 1870987 A1 12/2007

OTHER PUBLICATIONS

Search Report and Written Opinion from corresponding PCT/US2014/011895 dated May 9, 2014.

* cited by examiner

*Primary Examiner* — Nicholas Ponomarenko
(74) *Attorney, Agent, or Firm* — Fletcher Yoder P.C.

(57) ABSTRACT

A generator airgap monitoring system includes a first proximity sensor disposed in a first location of a stator and configured to transmit a first signal representative of a first distance between the first proximity sensor and a plurality of rotor poles of a rotor, and a controller communicatively coupled to the first proximity sensor. The controller is configured to derive a first plurality of instantaneous airgaps based on the first signal and to determine a difference between a first instantaneous airgap of the first plurality of instantaneous airgaps and a second instantaneous airgap of the first plurality of instantaneous airgaps. The first plurality of instantaneous airgaps includes a first plurality of measurements of airgaps between the stator and the plurality of rotor poles when the rotor is rotating. The first instantaneous airgap and the second instantaneous airgaps include measurements for respective rotor poles.

20 Claims, 6 Drawing Sheets

SYSTEM AND METHOD FOR DETERMINING POLE SHIFT

BACKGROUND OF THE INVENTION

The subject matter disclosed herein relates to proximity probes, such as proximity probes used in electric generators.

Electric generators include a stator and a rotor. The rotor rotates about an axis relative to the stator. Rotor poles extend radially from the rotor and rotate an electromagnetic field through the stator to generate electricity. An airgap separates the rotor poles and the stator from contact during rotation. However, the airgap may change during operation of the electric generator. Contact between the rotor and stator of the electric generator is generally undesirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a first proximity sensor and a controller. The first proximity sensor is disposed in a first location of a stator and configured to transmit a first signal representative of a first distance between the first proximity sensor and a plurality of rotor poles. The controller is communicatively coupled to the first proximity sensor. The controller is configured to derive a first plurality of instantaneous airgaps based on the first signal and to determine a difference between a first instantaneous airgap of the first plurality of airgaps and a second instantaneous airgap of the first plurality of airgaps. The first plurality of instantaneous airgaps includes a first plurality of measurements of gaps between the stator and the plurality of rotor poles when the rotor is rotating.

In another embodiment, a method includes sensing a first plurality of instantaneous airgaps between a plurality of rotor poles and a stator by using a first proximity sensor, assigning each instantaneous airgap of the first plurality of instantaneous airgaps to a respective rotor pole of the plurality of rotor poles, and determining a difference between each assigned instantaneous airgap and a baseline airgap for the respective rotor pole.

In another embodiment, a system includes a non-transitory tangible computer-readable medium having executable code. The executable code includes instructions for sensing a first plurality of instantaneous airgaps between a plurality of rotor poles and a stator using a first proximity sensor. The executable code also includes instructions for assigning each instantaneous airgap of the first plurality of instantaneous airgaps to a respective rotor pole of the plurality of rotor poles. The executable code also includes instructions for determining a plurality of differences corresponding to the difference between each assigned instantaneous airgap and a baseline airgap for the respective pole.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

This written description uses examples to disclose the invention, including the best mode, and also to enable any person skilled in the art to practice the invention, including making and using any devices or systems and performing any incorporated methods. The patentable scope of the invention may include other examples that occur to those skilled in the art. Such other examples are intended to be within the scope of the invention if they have structural elements that do not differ from the literal language of the claims, or if they include equivalent structural elements with insubstantial differences from the literal languages of the claims.

Presently contemplated embodiments of a power generator system, such as a hydro generator system, include an airgap monitoring system to monitor the airgap between the rotor and stator of the generator system. The rotor includes a set of rotor poles that rotate about an axis within the stator. The airgap monitoring system includes at least one proximity sensor to transmit a signal representative of the distance between the stator and the rotor during rotation of the rotor. The airgap monitoring system may derive a plurality of "instantaneous airgaps" during each rotation, so named because the airgap includes the distance between the proximity sensor and each rotor pole at an instant in time when the proximity sensor and the rotor pole face towards each other. The plurality of instantaneous airgaps may be displayed, stored in memory, and analyzed to provide information pertaining to the status of the rotor, stator, and/or rotor poles. In some embodiments, the airgap monitoring system may provide information pertaining to the relative shape and changes in the relative shape of the stator and rotor. In some embodiments, the airgap monitoring system may monitor the rotor poles for shifts during operation of the generator system. Through usage, the rotor poles may shift and the shapes of the rotor and stator may be affected by the operational state (e.g., load, rotor speed, field excitation) and environmental parameters (e.g., air temperature, water temperature). The derived instantaneous airgaps may be used to determine the shape of the rotor and stator and rotor pole shifts at various points in time.

In one example, a statistical alarm limit or limits may be placed on the individual pole airgap values. However this may be tedious for a field engineer, and these airgap values may change with load, and possibly other states. In another example, instantaneous airgap differences between adjacent poles may be determined, and statistical alarms may then be applied. It may be advantageous to calculate an airgap value for each pole during the appropriate state (e.g., machine and/or operational state as described in more detail below), and then save these values as baseline reference values. These baseline reference values may then be compared to the actual measured (and conditioned or processed) airgap values, and alarms and alerts may then be triggered based on thresholds (e.g., comparing the airgap values to determine if the values fall within or outside a range of values), or statistical methods. A similar technique may also be applied to adjacent pole airgap differences. Each of the adjacent differences may be baselined at the appropriate state, and the baselines used to compare to measured adjacent airgap differences. Alarms and alerts may then be derived by using thresholds and/or statistical techniques based on the comparison between the currently measured adjacent airgap differences and baselined differences.

For example, the airgap monitoring system may compare the currently derived instantaneous airgap of a rotor pole with currently derived instantaneous airgaps from other rotor poles (e.g., nearby or adjacent rotor poles), with statistics of the plurality of airgaps, or with reference data stored in memory (e.g., previously derived baseline airgaps based on operational states and/or environmental conditions), Additionally or alternatively to the use of baselining, certain models (e.g., regression or learning models) may be used. The models may be created automatically based on sensed data and used to model or simulate how each pole gap changes under the different operational or machine states. These models may then be used to predict the airgap during the appropriate machine state, and the prediction may be compared with the measured airgap. Differences may indicate, for example, a shift in pole radial position. Indeed, differences between the currently derived instantaneous airgaps and the reference data (e.g., state baseline data) and/or differences between model-predictive values and measured values may indicate changes in the rotor shape, changes in the stator shape, or shifts in the rotor poles.

The airgap monitoring system may produce an operator notification (e.g., alarm, alert) when the aforementioned differences are beyond a threshold, such as a threshold for rotor shape or a threshold for minimum airgap. Reference data and models may be used to estimate the shape of the rotor or stator and airgaps in different operational states. Predicted airgaps derived by using the models (e.g., regression or learning models) may enable the airgap monitoring system to compare instantaneous airgaps to a baseline when the generator system is, for example, in a new or less frequently monitored operational state. The learning models may be produced through heuristic models, neural networks, expert systems, genetic algorithms, fuzzy logic, or any combination thereof. By using techniques such as baselining and/or modeling, the airgap behavior for a specific installation may be more easily predicted and anomalies may be more easily detected.

Figure 1:
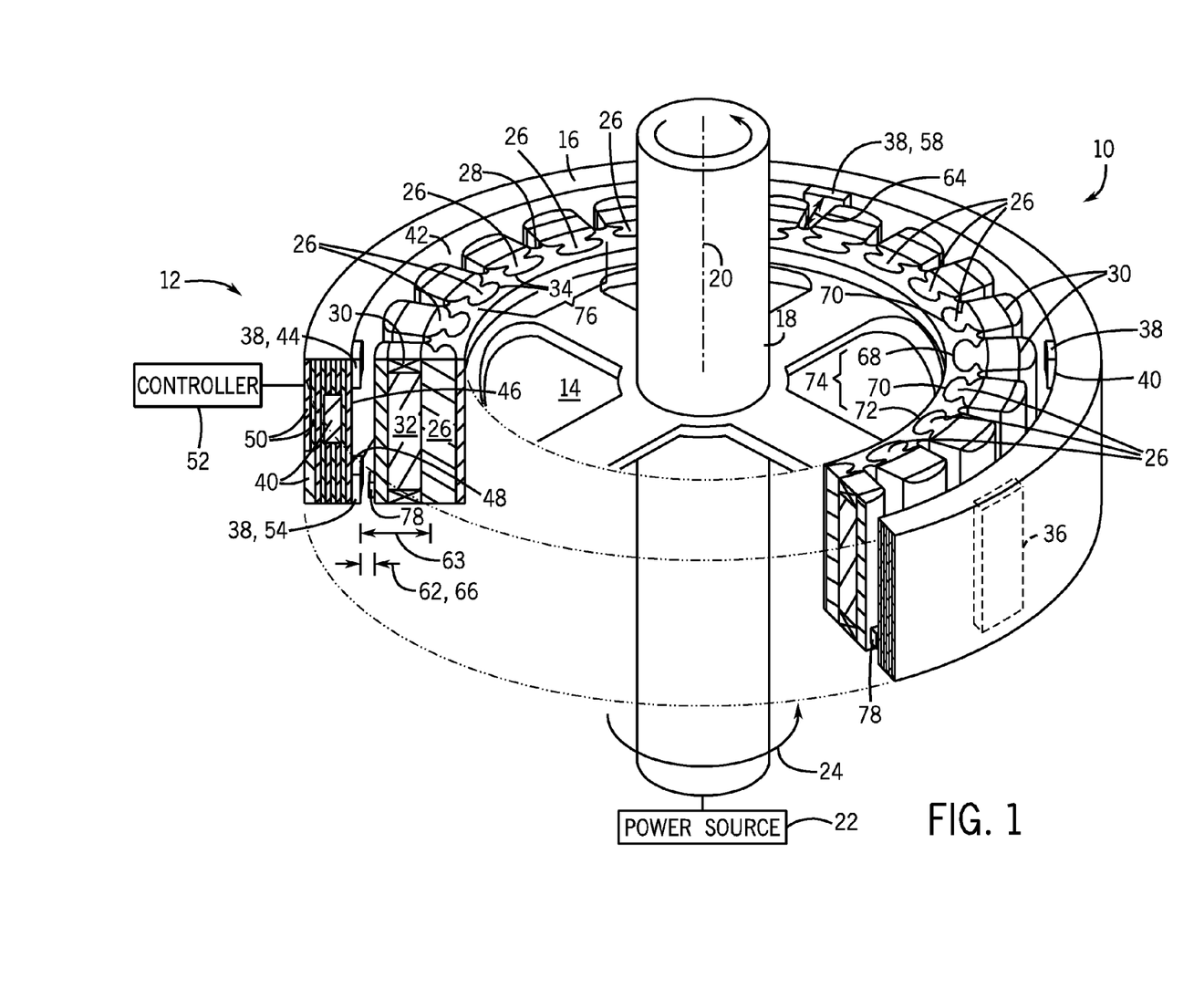
FIG. 1 is a schematic of an embodiment of a generator having an airgap monitoring system.

With the foregoing in mind, FIG. 1 illustrates an embodiment of a generator system 10 with an airgap monitoring system 12 that may sense and monitor the relationship between a rotor 14 and a stator 16. The rotor 14 is coupled to a shaft 18 and is rotatable about a rotor axis 20. A power source 22 coupled to the shaft 18 drives the rotor 14 in a first direction 24 about the rotor axis 20. The power source 22 includes, but is not limited to a hydro turbine, air turbine, gas turbine, or other turbomachinery.

Rotor poles 26 are distributed about an outer surface 28 of the rotor 14. Each rotor pole 26 has a coil 30 circumferentially disposed about a pole core 32. In some embodiments, the rotor poles 26 are salient poles and the pole cores 32 are removably coupled to the rotor 14 with a dovetail joint 34 fit (e.g., interference fit) in the outer surface 28, as shown for some of the rotor poles 26 in FIG. 1. In other embodiments, the rotor poles 26 are integrally formed with the rotor 14. The rotor poles 26 may produce an electromagnetic field when electricity is directed through the coils 30. The rotor 14 is configured to induce a current through stator coils 36 of the stator 16 when the rotor 14 rotates within the stator 16.

The airgap monitoring system 12 includes one or more proximity sensors 38 coupled to the stator 16. Some embodiments of the airgap monitoring system 12 include multiple proximity sensors 38 (e.g., 2, 3, 4, 5, 6, 8, 10, 12, 14, 16, or more). The one or more proximity sensors 38 may be coupled at different locations 40 on, or within, the stator 16. For example, proximity sensors 38 may be coupled to locations 40 on an inner wall 42 (e.g., top portion 44, middle portion 46, bottom portion 48) of the stator 16 or within the stator 16 (e.g., between laminations 50). In some embodiments, one or more proximity sensors 38 may be arranged in substantially opposite locations of the stator 16. In an embodiment with multiple proximity sensors 38, a first proximity sensor 38 may be circumferentially and/or axially spaced along the stator 16 from a second proximity sensor 38. In some embodiments, one or more proximity sensors 38 are equally spaced in substantially co-planar locations 40 (e.g., top portion 44, middle portion 46, or bottom portion 48) of the stator 16. The one or more proximity sensors 38 may be communicatively coupled to a controller 52. In some embodiments, a first proximity sensor 54 may be placed at the bottom portion 48 of the inner wall 42, and a second proximity sensor 58 may be placed at the top portion 44 of the inner wall 42. Some embodiments may have only the first proximity sensor 54 placed at the bottom portion. Some embodiments may have multiple proximity sensors 38 arranged in other locations 40 on the inner wall 42 or within the stator 16. The first and second proximity sensors 54, 58 are intended to be shown only as non-limiting examples for clarity of discussion.

FIG. 1 illustrates a cut-away view of an embodiment of a generator system 10. As may be appreciated, the rotor 14 and stator 16 may be substantially circular, and the rotor poles 26 may be arranged at substantially regular intervals about the outer surface 28 of the rotor 14. In some embodiments, the proximity sensors 38 are Hall effect sensors. Each proximity sensor 38 may transmit a signal to controller 52 representative of a distance between the proximity sensor 38 and the rotor 16 as the rotor 16 rotates about the rotor axis 20. The signal may represent the distance between the proximity sensor 38 and portions of the rotor 16 opposite the proximity sensor 38, such as the rotor poles 26 or the outer surface 28. For example, as shown in FIG. 1, the signal from the first proximity sensor 54 would represent a first distance 62 between the first proximity sensor 54 and a rotor pole 26, and the signal from the second proximity sensor 58 would represent a second distance 64 between the second proximity sensor 58 and the outer surface 28. If the rotor outer surface 28 is opposite the first proximity sensor 54, the signal from the first proximity sensor 54 would represent the distance shown by arrow 63. The distance between a proximity sensor 38 and a rotor pole 26 facing the proximity sensor 38 is defined herein as an airgap 66 (e.g., instantaneous airgap). The controller 52 may derive a plurality of airgaps 66 from the signals received from each proximity sensor 38 during each rotation of the rotor 16. In some operational environments, the airgaps 66 may be approximately less than or equal to 5, 4, 3, 2, 1, or 0.5 cm, or any measurement between approximately 0 and 10 cm (approximately 0 and 4 inches) or more.

The plurality of airgaps 66 derived by the controller 52 for each proximity sensor 38 may vary based on different factors.

For example, centrifugal, thermal, and magnetic forces on the rotor 14 may shift the rotor poles 26 relative to the inner wall 42 of the stator 16 during operation of the generator system 10. In some operational environments, asymmetries in the shape of the rotor 14 and/or stator 16 may affect the magnitudes of the plurality of airgaps 66. By using the techniques described herein, such as state baselining and/or modeling techniques, the proximity sensors 38 and controller 52 may enable the airgap monitoring system 12 to determine the shifts of the rotor poles 26 during operation of the generator system 10, such as shifts over time or between rotations. The airgap monitoring system 12 may then notify the operator of rotor pole shifts relative to the inner wall 42. Airgaps 66 for rotor poles 26 within thresholds may increase the operating efficiency of the rotor 14 and indicate the rotor 14 is operating as designed with respect to the stator 16. Using the techniques described herein, the airgap monitoring system 12 may sense the rotor pole shifts with a tolerance of approximately between 10 to 1 mm, 10 mm to 10 nm, or approximately 10 mm to 2.5 μm (e.g., approximately between 0.25 to 0.0001 inches). The airgap monitoring system 12 may derive a shift of a certain rotor pole 68 relative to itself in previous rotations about the rotor axis 20 and/or relative to other rotor poles 26 (e.g., adjacent rotor poles 70 and/or nearby rotor poles 72). Some rotor poles 26 may shift more than other rotor poles 26. In some embodiments, the airgap monitoring system 12 may sense the relative shifts of a group 74 of rotor poles 26 relative to another group 76.

In some embodiments, the controller 52 may identify each rotor pole 26 and assign an airgap 66 from each proximity sensor 38 to the respective rotor pole 26. In this manner, all rotor poles 26 may have a related airgap 66. One or more rotor poles 26 may have an indicator 78 that may be sensed by the proximity sensors 38. The indicator 78 may be a magnetic field source (e.g., magnet, coil), a textured or colored surface, a ridge, a notch, or geometric shape on the rotor pole 26 suitable for differentiating a particular rotor pole from other rotor poles. The indicator 78 may enable the controller 52 to identify each rotor pole 26 from the transmitted signals and to correlate each rotor pole 26 to the respective derived airgaps 66. In some embodiments, a proximity sensor 38 may transmit a rotational signal (e.g., keyphasor) representative of the indicator 78 traversing the proximity sensor 38. In some embodiments, the controller 52 assigns the airgap 66 for each rotor pole 26 based at least in part on the sensed rotational signal, the number of rotor poles 26, and the direction 24 of rotation. The controller 52 may assign the plurality of airgaps 66 to the rotor poles 26 during operation of the generator system 10, that is, while the rotor 16 is rotating about the rotor axis 20. In this way, the controller 52 derives the airgap 66 for each rotor pole 26 during operation of the generator system 10.

Figure 2:
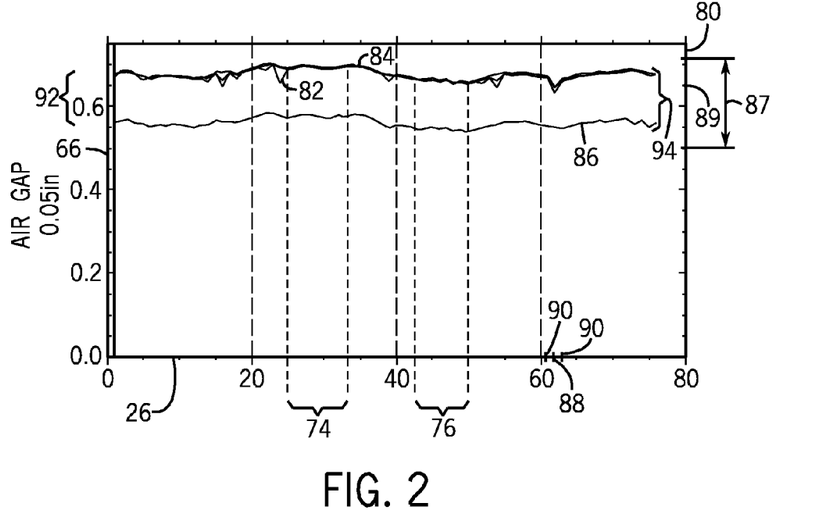
FIG. 2 is a chart of an embodiment of instantaneous airgaps assigned to rotor poles.

FIG. 2 illustrates a chart 80 of an embodiment of instantaneous airgaps assigned to rotor poles from multiple proximity sensors. The curves 82, 84, and 86 represent the derived airgaps 66 (e.g., ordinate or Y-axis) by using signals from three different proximity sensors 38 corresponding to the rotor poles 26 (e.g., abscissa or X-axis) for a full rotation of the rotor. As described above, the rotor may have a plurality of rotor poles 26, such as the seventy-six rotor poles shown on the X-axis of FIG. 2. The derived airgaps 66 shown on the Y-axis for each rotor pole 26 may be relative to the location (e.g., inner wall) of the respective proximity sensor 38 on the stator 16. The shape of the curves 82, 84, and 86 provide a relative measure of the rotor shape relative to the stator 16. A flat curve (e.g., consistent airgap 66 for all rotor poles 26) indicates a substantially circular rotor 14. In some embodiments, curves having substantially consistent airgaps indicate that the rotor is concentric about the rotor axis. Differences between the curves 82, 84, and 86 indicate different airgaps 66 derived by the controller 52 for the same rotor pole 26 from the three proximity sensors 38. The third curve 86 indicates a smaller airgap 66 for each rotor pole 26 relative to the first and second curves 82, 84. This may indicate a bias in the signals received for the third curve 86 from the third proximity sensor, such as if the third proximity sensor is coupled to the inner wall 42 differently (e.g., closer) than the first and second proximity sensors or the inner wall of the stator 16 at the third proximity sensor may not be uniform (e.g., stator 16 is out of round). Differences in the airgaps 66 among groups of rotor poles 26 may indicate an out of round rotor 14. For example, the group 74 of rotor poles 26 as shown in FIG. 2 have greater airgaps 66 for each curve 82, 84, 86 relative to another group 76.

The rotor 14 and stator 16 may operate within a design airgap range 87. The controller 52 may determine if the derived airgaps 66 are beyond thresholds (e.g., outside the design airgap range 87). For example, variations of the average airgap between any two proximity sensors 38 greater than approximately 0.01 to 1 percent, 0.001 to 10 percent, 15, 20, 25, or 30 percent of the design airgap 89 may indicate an out of round stator 16. Average airgaps for any proximity sensor 38 that deviates greater approximately 0.01 to 1 percent, 0.001 to 10 percent, 15, 20, 25, or 30 percent of the design airgap 89 may indicate an out of round rotor 14. The controller 52 may provide an operator perceptible notification (e.g., alarm, alert) through a user interface of an out of round stator 16 or rotor 14.

Variations in the airgap 66 between rotor poles 26 may indicate pole shifts. Rotor poles 26 may shift due to a variety of factors (e.g., centripetal force, wear, operating conditions, or environmental conditions). For example, the airgap 66 of the first and second curves 84, 86 at the first rotor pole 88 is less than the airgap at the adjacent rotor poles 90. This may indicate a shift in the first rotor pole 88. The controller 52 may provide an operator perceptible notification of variations between the design airgap 89 and any airgap greater than a threshold of approximately 0.01 to 1 percent, 0.001 to 10 percent, 5, 7, 10, 15, or 20 percent. In some embodiments, the design airgap 89 may be approximately 0.025, 0.05, 0.1, 0.5, 1, 5, 10, 50 mm or more (0.001, 0.10, 0.25, 0.5, 1.0, or 2.0 inches, or more). The controller 52 may notify the operator of each particular rotor pole with the airgap variation beyond the threshold, or to enter into a failsafe mode based on the airgap variation.

Figure 3:
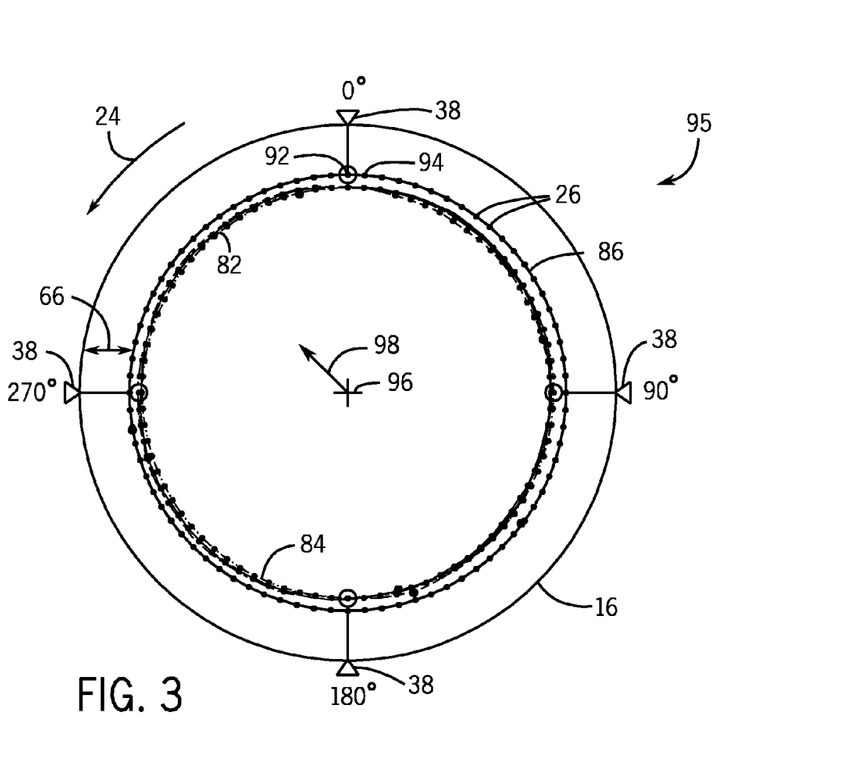
FIG. 3 is a circular chart of an embodiment of instantaneous airgaps assigned to rotor poles.

In some embodiments, the controller 52 determines the absolute and local maximum and minimum airgaps for each proximity sensor 38 for each rotation of the rotor 14. Local maximum airgaps correspond to rotor poles with airgaps greater than airgaps of adjacent or nearby rotor poles, and local minimum airgaps correspond to rotor poles with airgaps less than airgaps of adjacent or nearby rotor poles. The absolute maximum and minimum airgaps may be compared to the design airgap 89. The controller 52 may provide an operator perceptible notification if the absolute maximum and/or minimum airgaps are outside the design airgap range 87. The controller 52 may monitor both the absolute and local maximum and minimum airgaps for variations over time that may indicate shifts of the rotor poles or changes in the shape of the rotor 14. The derived airgaps 66 may be displayed on a user interface in various forms. In certain embodiments, only the absolute and local maximum and minimum airgaps are displayed on a user interface. In some embodiments, the derived airgaps 66 may be displayed in the form of the chart 80 with one or more curves (e.g., curves 82, 84, and 86). The derived airgaps 66 are shown as a distance from the X-axis. In other embodiments, the curves 82, 84, and 86 may be arranged so that the first curve ends 92 join the second curve ends 94 to form a substantially circular plot 95 as shown in FIG. 3. In some embodiments, rotor poles 38 may be identified by degrees from the first rotor pole shown at 0°. The curves 82, 84, and 86 may encircle a point 96 representing the rotor axis 20 shown in FIG. 1, and the derived airgap 66 decreases in a radial direction 98 out from the point 96. The stator 16 may be shown with a plurality of proximity sensors 38 at locations 40 about the point 96.

Figure 4:
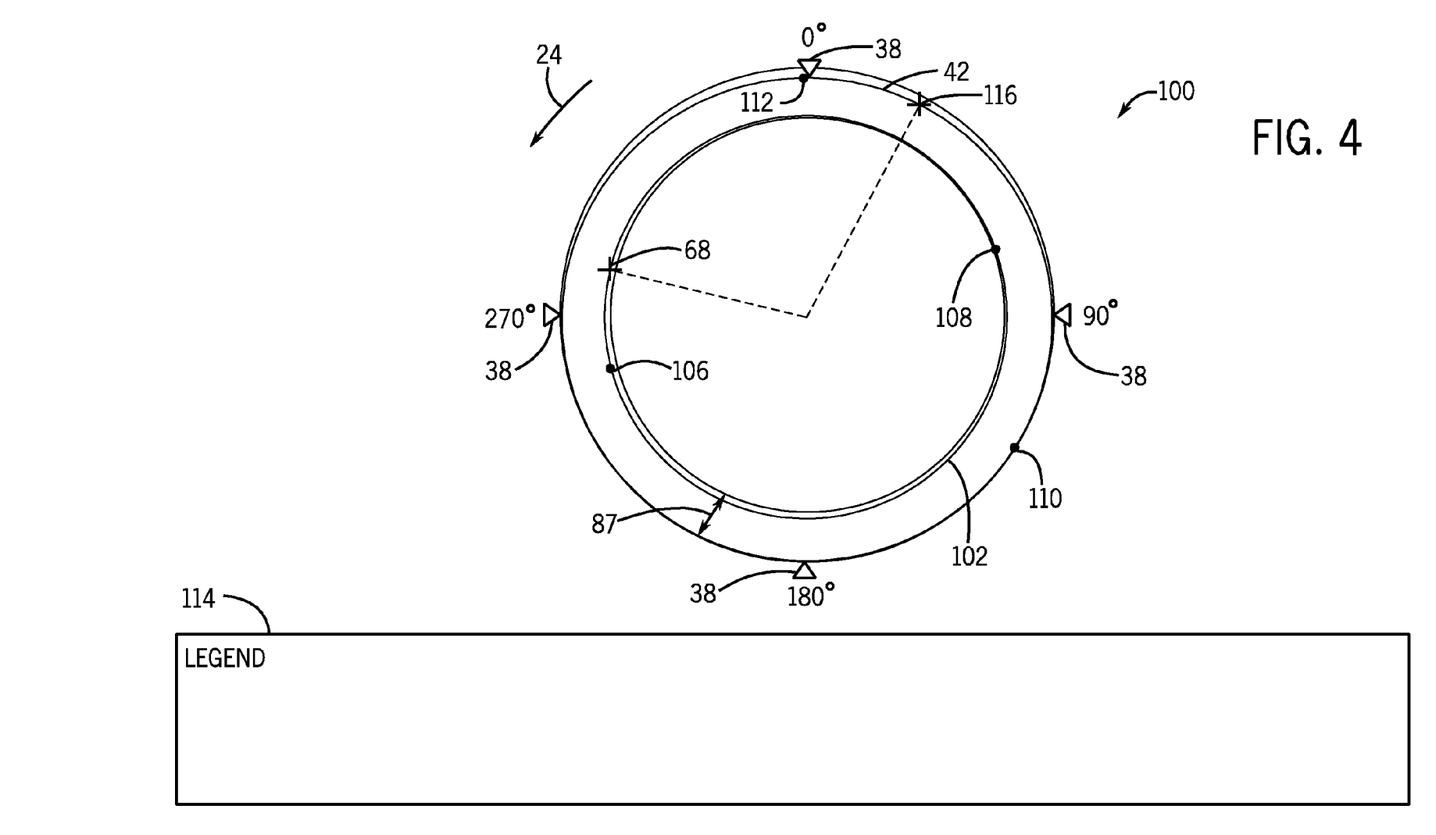
FIG. 4 is a graphical representation of an estimate of the rotor shape.

FIG. 4 illustrates an embodiment of a graphical view 100 of the rotor and stator shape. In some embodiments, the controller 52 may determine a graphical representation of a rotor shape 102 based at least in part on the signals from the proximity sensors 38. The proximity sensors 38 are shown as placed on the inner wall 42 of the rotor 16. The shape of the inner wall 42 may be estimated, based on signals of the proximity sensors 38, or user input, or any combination thereof. The rotor shape 102 may be compared with the design airgap range 87. The controller 52 may identify a minimum airgap rotor pole 106 and a maximum airgap rotor pole 108. The minimum airgap rotor pole 106 may be the rotor pole with the lowest value instantaneous airgap relative to the other rotor poles from the instant rotation. The instantaneous airgap of the minimum airgap rotor pole 106 may represent the least clearance between the rotor and the stator. The maximum airgap rotor pole 108 may be the rotor pole with the greatest value instantaneous airgap relative to the other rotor poles from the instant rotation. The instantaneous airgap of the maximum airgap rotor pole 108 may represent the greatest clearance between the rotor and the stator. In some embodiments, the controller 52 may identify a widest point 110 and a narrowest point 112 of the stator inner wall 42. The widest point 110 is the estimated point of the stator inner wall 42 at which the instantaneous airgap for each rotor pole would be the greatest. The narrowest point 112 is the estimated point of the stator inner wall 42 at which the instantaneous airgap for each rotor pole would be the least. The lowest value instantaneous airgap may be estimated to occur where the minimum airgap rotor pole 106 passes opposite the narrowest point 112 of the stator inner wall 42.

In some embodiments, the graphical view 100 may enable the operator to determine the derived airgap for any rotor pole during a rotation and/or to determine a predicted airgap for when a rotor pole traverses a location of the stator on a subsequent rotation. The derived and predicted airgap may be displayed in a legend 114 of the graphical view 100. The legend 114 may also display other parameters, including the absolute and local maximum and minimum airgap values, mean airgaps, rotor shape factor, rotor axis offset, stator axis offset, design airgap, power generation, rotor speed, and so forth. To determine a predicted airgap, the operator may select a certain rotor pole 68 and a location 116 on the inner wall 42. The controller 52 may determine the predicted airgap for when the first rotor pole 68 traverses the location 116 based at least in part on previously derived airgaps, the environmental conditions, or operating conditions, or combinations thereof.

Figure 5:
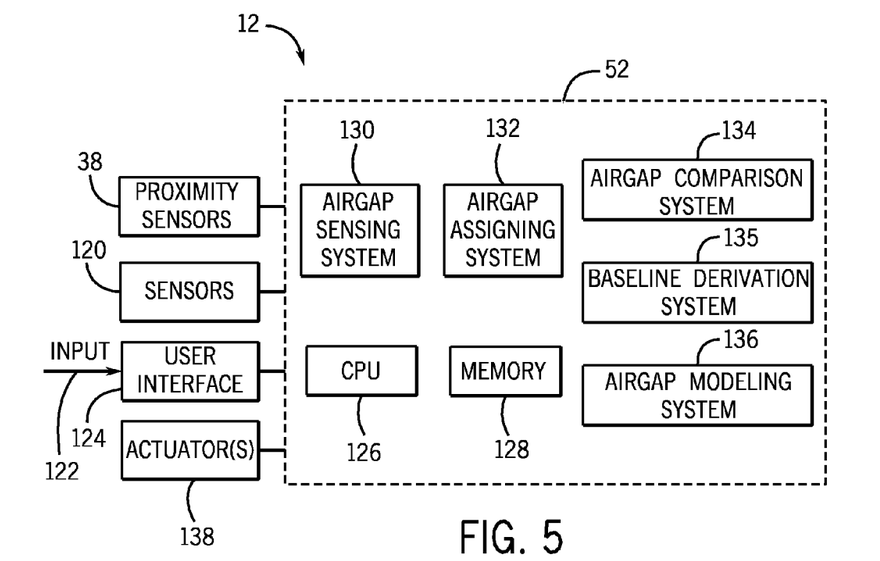
FIG. 5 is a block diagram of an embodiment of the airgap monitoring system.

FIG. 5 illustrates an embodiment of the airgap monitoring system 12 to derive and compare the airgaps 66 (e.g., shown in FIG. 1) between the rotor poles 26 and the stator 16. Proximity sensors 38 coupled to the controller 52 may transmit signals representative of the first distance 62 between the proximity sensors 38 and the inner wall 42. As may be appreciated, other types of sensors 120 may transmit signals to the controller 52 representative of other parameters of the generator system 10, including but not limited to air temperature, water temperature, operating temperature, operating time, ambient air pressure, rotor speed, generator load, field strength, circuit breaker position, and so forth. Additionally, the controller 52 may receive user input 122 through a user interface 124. User input may include the number of rotor poles, the rotor mass, load capacity, and so forth. User input 122 may enable the controller 52 to derive the airgaps and/or to improve the comparison of airgaps.

The controller 52 includes a processor 126 and memory 128 used to receive and process the signals received from the proximity sensors 38, other sensors 120, and/or user input 122. The processor 126 is operably coupled with the memory 128 (e.g., volatile or nonvolatile memory) to execute instructions for systems, programs, or control modules of the controller 52. Systems may include an airgap sensing system 130, an airgap assigning system 132, an airgap comparison system 134, a baseline derivation system 135, or an airgap modeling system 136, or any combination thereof. Such systems include programs or instructions executed by the processor 126 that may be stored in one or more tangible, computer-readable media (e.g., memory 128) at least collectively storing the instructions or routines. The memory 128 may include any suitable articles of manufacture for storing data and executable instructions, such as random-access memory, read-only memory, rewritable flash memory, hard drives, and optical discs. Also, software (e.g., an operating system) encoded on such a computer-readable media (e.g., memory 128) may also include instructions (e.g., systems 130, 132, 135, 135, and 136) that may be executed by the processor 126.

The airgap sensing system 130 may derive the plurality of airgaps 66 for each coupled proximity sensor 38 from the received signals. The proximity sensor 38 may transmit a plurality of signals representing the first distance 62 between the proximity sensor 38 and each respective rotor pole 26 for each rotation of the rotor 14. In some embodiments, the plurality of signals may be representative of the distance between the proximity sensor 38 and both the rotor poles 26 and outer surface 28 of the rotor 14. The airgap sensing system 130 may filter the plurality of signals to obtain only rotor pole signals representative of the first distance 62 between the proximity sensor 38 and the rotor poles 26. In some embodiments, the airgap sensing system 130 may derive the maximum, minimum, median, and/or mean airgap for each rotor pole 26 during a rotation. The airgap sensing system 130 may also sense the indicator 78 through the sensed rotational signal of the proximity sensor 38.

The airgap assigning system 132 may assign the derived plurality of airgaps to each rotor pole 26. Each rotor pole 26 may be associated with an identifier (e.g., number, character, symbol). The identifier may be physically located on the rotor pole 26 and/or stored in memory 128. The identifier may be assigned during the manufacture, installation, maintenance, or operation of the generator system 10. In some embodiments, each of the one or more indicators 78 is associated with a particular identifier. The airgap assigning system 132 may index the rotor poles 26 by the identifiers and assign the derived airgaps to an identifier and rotor pole 26 based at least in part on the indicator 78. In some embodiments, the airgap assigning system 132 may assign the derived airgaps substantially instantaneously, or in less than 1 second, 1 millisecond, 1 microsecond. The controller 52 may use the starting rotor pole, the number of rotor poles, and the rotational direction to assign the derived airgaps. For example, a plurality of indicators 78 may enable the controller 52 to determine the quantity of rotor poles 26 and the rotational direction 24. The quantity of rotor poles 26 may also be determined from the frequency of the electrical power generated by the generator system 10 and the rotor speed. For example, controller 52 may determine the quantity of rotor poles 26 as twice the product of the frequency (Hz) divided by the rotor speed (rpm). The identifier for the starting rotor pole may be stored in memory 128 or received as user input 122. In some embodiments, an indicator 78 identifies the starting rotor pole, and the quantity and rotational direction of the rotor poles are received as user inputs 122.

The airgap assigning system 132 may instantaneously assign the derived airgaps to each respective rotor pole 26 as instantaneous airgaps. In this way, the airgap assigning system 132 may update the instantaneous airgaps for each rotor pole 26 during operation of the generator system 10. In some embodiments, the user interface 124 may display visualizations representative of the instantaneous airgaps, such as the chart 80 (FIG. 2), circular plot 95 (FIG. 3), and/or graphical view 100 (FIG. 4). The derived airgaps may be stored in memory 128 as reference data according to indexing criteria. For example, the derived airgaps may be indexed in memory 128 based on factors including the operational state of the generator system 10, the time the airgaps were derived, or based on a comparison with airgaps of other rotor poles 26, and so forth.

The airgap comparison system 134 may analyze the derived airgap of each rotor pole 26. In some embodiments, the airgap comparison system 134 analyzes the plurality of instantaneous airgaps of the generator system 10 as the derived airgaps are received from the airgap sensing and assigning systems 130, 132 in a real-time process of the controller 52. The airgap comparison system 134 may compare the derived airgap of each rotor pole to a baseline airgap for the respective rotor pole. The baseline airgap for the rotor pole may be calculated, for example, by a baseline derivation system 135. The baseline derivation system 135 may determine a baseline airgap for each rotor pole, groups of rotor poles, or substantially all of the rotor poles. The baseline derivation system 135 may determine the baseline airgaps based at least in part on the operational state of the generator system 10, other derived airgaps (e.g., adjacent airgaps, maximum airgaps, minimum airgaps), reference data (e.g., previously derived airgaps, average derived airgaps, lookup tables, predicted airgaps), or a combination thereof. Additionally or alternatively, baselines may be derived by a learning model, a statistical model, or a combination thereof, automatically generated by the airgap modeling system 136. For example, observations (e.g., observations from proximity sensors 38 and/or sensors 120) may be used to automatically create a neural network suitable for modeling the operating behavior of the system 10, and the baselines may be derived by observing the standard behavior from this neural network model. Accordingly, deviations outside of the observed patterns may be considered outside the baseline. In this similar manner, other machine learning techniques may be used for baselining. For example, genetic algorithms may be evolved to observe normal operations, and deviations from normal operations are then flagged as outside the baseline. Likewise, fuzzy logic, expert systems, state vector machines (SVMs), decision tree learning, association rule learning, inductive logic learning, and the like, may be used to automatically derive a model suitable for delineating an operating baseline and determining operations outside the baseline. The airgap modeling system 136 may enable a baseline to be estimated for a set of operating conditions that do not correspond to previously derived instantaneous airgaps. In this same manner, statistical models (e.g., linear regression models, nonlinear regression models, data mining models, classification models, and the like) may be used to define a baseline and observations outside of the baseline.

The airgap comparison system 134 may compare the instantaneous airgap for the certain rotor pole 68 to the instantaneous airgap of rotor poles adjacent and/or nearby the certain rotor pole 68 to determine the rotor shape. The airgap comparison system 134 may notify the user through the user interface 124 when the derived airgap of the certain rotor pole 68 changes beyond a threshold (e.g., baselines) relative to the derived airgaps corresponding to adjacent and/or nearby rotor poles. A threshold for the derived airgap of a single rotor pole may be approximately 1, 2, 3, 4, 5, or 10 percent of the derived airgap of adjacent and/or nearby rotor poles. In some embodiments, the airgap comparison system 134 may compare the instantaneous airgap for the certain rotor pole 68 to reference data for the certain rotor pole 68 to determine changes to the rotor shape over time, such as shifts of the certain rotor pole 68. The airgap comparison system 134 may notify the user when the derived airgap of the certain rotor pole 68 changes beyond a threshold of approximately 5, 7, 10, 15, or 20 percent of the reference data. The thresholds may change based on the operational state of the generator system 10.

The generator system 10 may operate in a plurality of operational states (e.g., 2, 3, 4, 5, 6, 7, 8, 9, 10, 20, 100, or more). Operational states may be defined based on generator parameters (e.g., rotor speed, field excitation), environmental parameters (e.g., air temperature, water temperature), system parameters (e.g., age of components, load consistency), or a combination thereof. For example, the generator system 10 may operate in one of eight states defined by generator parameters as listed in Table 1:

TABLE 1

Example operational states for the generator system are set forth in Table 1. Each operational state corresponds to the given set of generator parameters.

| Operational State | Generator Parameters |
| --- | --- |
| State 0 - Standstill | rotor speed < 5% design speed |
| State 1 - Mechanical Runup/Rundown | 5% ≤ rotor speed ≤ 95% design speed |
| State 2 - Rated Speed; De-energized | rotor speed > 95% design speed<br>field excitation status: OFF |
| State 3 - Energized; Unsynchronized | rotor speed > 95% design speed<br>field excitation status: ON<br>generator circuit breaker: OPEN |
| State 4 - Synchronized; Unloaded | rotor speed > 95% design speed<br>field excitation status: ON<br>generator circuit: CLOSED<br>output power < 10% rated load |
| State 5 - Load Transient | rotor speed > 95% design speed<br>field excitation status: ON<br>generator circuit: CLOSED<br>10% ≤ output power ≤ 95% rated load |
| State 6 - Loaded Thermally Stable | rotor speed > 95% design speed<br>field excitation status: ON<br>generator circuit: CLOSED<br>output power > 95% rated load for more than 1 hour |
| State 7 - Undefined | unknown generator parameters |

The derived airgap baselines for each rotor pole 26 may be calculated based at least in part on the operational state of the generator system 10. Indeed, one or more baselines may be derived for each of the operational states, such as the states listed in Table 1. Some operational states may affect each of the rotor poles 26 in a substantially similar manner. For example, increasing the temperature of the rotor poles 26 to substantially the same temperature may expand each rotor pole 26 substantially the same percentage. Some operational states may affect some rotor poles 26 differently than other rotor poles 26. For example, moving the center of the rotor 14 in a first direction may increase the derived instantaneous airgap 66 between the rotor poles 26 and locations 40 on the inner wall 42 opposite to the first direction and decrease the derived instantaneous airgap 66 between the rotor poles 26 and locations 40 on the inner wall 42 in the first direction without substantially affecting the derived instantaneous airgap 66 between the rotor poles 26 and other locations 40 on the inner wall 42.

The plurality of derived instantaneous airgaps 66 corresponding to the respective plurality of rotor poles 26 during a first operational state (e.g., State 1) may differ from the plurality of derived instantaneous airgaps 66 corresponding to the respective plurality of rotor poles 26 during a second operational state (e.g., State 6). For example, the plurality of rotor poles 26 may shift outward to decrease the airgaps 66 due to centripetal force as the operational state changes from State 0 to State 1 and State 2. Each of the rotor poles 26 may shift substantially the same amount as the centripetal force is substantially the same on each rotor pole 26. In State 3, the flux field may shift the rotor 14 in a direction toward a different rotor axis 20 than in State 2, affecting the airgap 66 for rotor poles 26 along the direction of the shift. In State 4 and State 5, the rotor poles 26 may warm and expand outward relative to State 3 as the load increases and the flux field induces current in the generator system 10. In State 6, the temperature of the rotor poles 26 may be substantially stable due to the duration of operation of the generator at a substantially steady load. While operating in State 6, the derived instantaneous airgap 66 may remain substantially constant due to the substantially stable temperature, centripetal force, flux field, and load. In some embodiments, an operational state such as State 7 may be used as a default operational state and/or used during testing. The eight operational states of Table 1 are only sample operational states and are not intended to limit the parameters, baselines, or number of operational states. For example, State 5 and State 6 may be subdivided into multiple operational states with different subranges of the output power as a percentage of the rated load, as well as baselines correlative with each subrange.

As discussed above, the operational state of the generator system 10 may be used to index or store the instantaneous airgaps stored in memory 128 as reference data. The airgap comparison system 134 may compare instantaneous airgaps derived during an operational state with reference data of the same or similar operational state. The airgap modeling system 136 may produce models, such as the machine learning models described above, and determine similar baselines based on the operational states suitable for use by the airgap comparison system. 134. Additionally or alternatively, similar operational states may be used, where the similar operational states may be states for which the parameters affecting the instantaneous airgap are similar, but not the same as the present operational state. As an example, State 6 may be a similar operational state for a generator system operating for more than 1 hour with a rotor speed at 85 percent of the design speed, field excitation ON, generator circuit CLOSED, and a load at 85 percent rated load. Subranges of states (e.g., state 5) may also be similar operational states to one another.

In some embodiments, the airgap modeling system 136 may produce statistics and/or learning models to compare to the instantaneous airgaps. For example, the airgap modeling system 136 may determine statistics (e.g., maximum, minimum, average, and median airgap values) for each rotor pole in a certain operational state. The average airgap for each rotor pole may be determined after filtering measurement variations. The filtered average airgap for each rotor pole may be updated with derived airgaps from subsequent rotor rotations and may be used to accurately determine the instantaneous airgap for each rotor pole. The statistics and differences may be used to determine if changes in the plurality of airgaps are within acceptable statistical variations (e.g., two standard deviations), and to determine baselines.

The airgap modeling system 136 may identify trends to monitor the plurality of derived airgaps in response to specific parameters. For example, the airgap modeling system 136 may develop a linear regression model from derived airgaps corresponding to specific parameters. The airgap monitoring system 136 may use the linear regression model as reference data to compare with the instantaneous airgaps as the rotor speed increases within an operational state. In some embodiments, a non-linear regression model may be used. The regression models may aid the identification of expected ranges of variation for the airgap as some parameters change within an operational state, or even across operational states. For example, increasing the rotor speed may generally decrease the derived airgap for each rotor pole, and decreasing the load may generally increase the derived airgap for each rotor pole. In some embodiments, the airgap modeling system 136 may interpolate or extrapolate models from reference data to compare with the derived airgaps. The controller 52 may provide an operator perceptible notification if derived airgaps differ from the models beyond a threshold (e.g., 5, 10, 15, or 20 percent). In some embodiments, the controller 52 may notify the operator if instantaneous airgaps differ from the models outside a statistical threshold (e.g., one or two standard deviations from the average) at the operational state. Models and statistics may be stored in memory 128.

In some embodiments, the airgap modeling system 136 utilizes machine learning techniques or rules to learn trends and produce one or more learning models. The learning models may be based at least in part on parameters (e.g., air temperature, water temperature, rotor speed, load) for operational states stored in memory 128. The learning models may also be based on the generator parameters, environmental parameters, user input 122, and characteristics of the generator system 10. The airgap modeling system 136 may use the learning models to predict the airgap for each rotor pole based on any combination of these parameters. In some embodiments the airgap modeling system 136 enables the instantaneous airgap prediction based on a set of parameters transmitted to the controller 52 that may not easily be categorized as belonging to any one of the operational states of Table 1. In this way, the airgap modeling system 136 enables the controller 52 to predict airgaps for operational states that do not correspond to previously defined operation states and/or to tune predicted airgaps for sub-operational states within the previously defined operational states. The learning model enables the controller 52 to tune predicted airgaps to correspond to specific parameters or narrow ranges of parameters, for example, for a specific installation of the system 10. Predicted airgaps may thus provide a baseline airgap for comparison when the operational state is dissimilar to previously monitored operational states and/or less common operational states. For example, the learning model may enable the controller 52 to predict the airgaps for each rotor pole in a sub-operational state of State 1 where an unloaded rotor operates at 50 percent of the design speed with an air temperature of 15° C. (° F.). The airgap modeling system 136 may tune the predicted airgaps based on changing parameters (e.g., air temperature, water temperature, rotor speed, load)

and updated instantaneous airgaps for substantially each operational state during operation of the generator system 10.

In some embodiments where the rotor and/or stator may be adjusted to affect the airgap, the controller 52 is configured to adjust the rotor and/or stator with one or more actuators 138. The one or more actuators 138 may adjust the relative position of the rotor 14 relative to the stator 16, such as by using magnetic bearings and/or mechanical positioners to adjust the rotor axis 20 and/or the pitch of the rotor 14. The one or more actuators 138 may be magnetic, pneumatic, hydraulic, or electric actuators.

Figure 6:
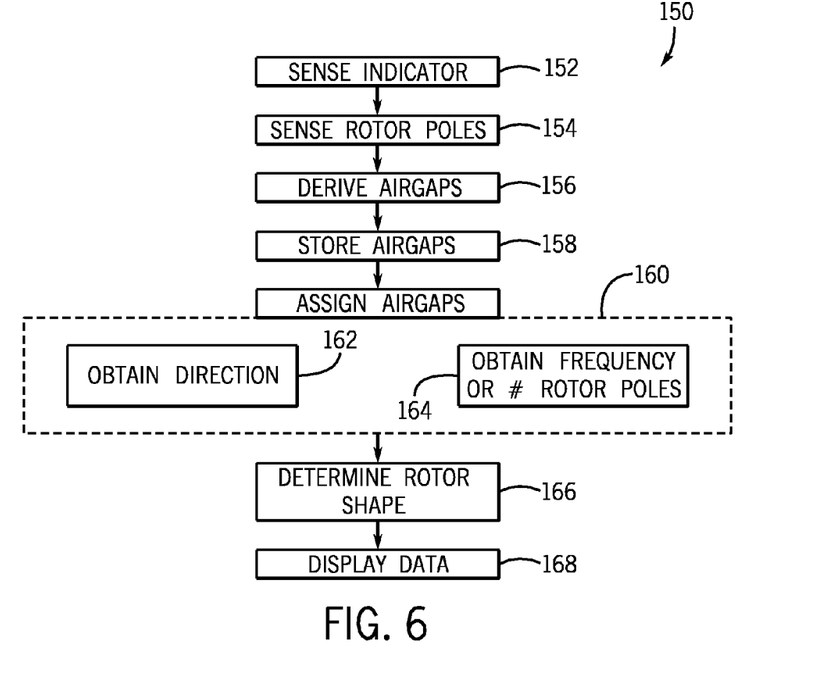
FIG. 6 is a flowchart of an embodiment of a process to assign instantaneous airgaps.

FIG. 6 is a flowchart of an embodiment of a process 150 for monitoring the generator system 10 over time and assigning the plurality of airgaps to the corresponding rotor poles. The process 150 may be implemented by using computer instructions stored in a non-transitory machine-readable medium, such as the memory 128 of the controller 52. The controller 52 may be a triple modular redundant (TMR) controller 52 having three cores suitable for redundant control operations. The airgap sensing system 130 and/or airgap assigning system 132 may implement the process 150.

The process 150 may sense (block 152) an indicator 78 of the rotor 14. The indicator 78 may be sensed as described above by one or more proximity sensors 38. In some embodiments, the rotor 14 may have a plurality of indicators 78. In some embodiments, sensing (block 152) the indicator 78 initializes the process 150. As described above, each indicator 78 may be used to differentiate a particular rotor pole from other rotor poles. The controller 52 may determine the starting rotor pole based on sensing (block 152) the indicator 78. The one or more proximity sensors 38 may sense (block 154) the plurality rotor poles as the rotor rotates within the stator. Each proximity sensor 38 may transmit a signal representative of the distance between the proximity sensor 38 and each sensed rotor pole to the controller 52. The controller 52 may derive (block 156) the airgaps (e.g., instantaneous airgaps) and store (block 158) the airgaps into memory 128.

To assign (block 160) each of the plurality of airgaps to the corresponding rotor pole, the controller 52 may use a starting rotor pole, the rotational direction of the rotor, and the number of rotor poles. The controller 52 may obtain (block 162) the rotational direction and may obtain (block 164) the number of rotor poles as user input 122 or through derivation from the one or more proximity sensors 38. In some embodiments, the controller 52 obtains (block 162) the direction of rotation based on detecting a sequence of indicators 78. For example, the rotor may rotate in a first direction where the rotor poles are sensed in an increasing order (e.g., 21, 22, 23, 24, 1, 2, 3, 4 . . . ) or in a second direction where the rotor poles are sensed in a decreasing order (e.g., 4, 3, 2, 1, 24, 23, 22, . . . ). In some embodiments, the controller 52 may obtain (block 164) the number of rotor poles directly through counting sensed rotor poles between the sensed indicator. The controller 52 may also obtain (block 164) the number of rotor poles by dividing the product of twice the frequency of the generated power in hertz by the rotor speed in revolutions per minute. After determining the number of rotor poles, the rotor direction, and the starting rotor pole, the controller may assign (block 160) each of the derived airgaps to the corresponding rotor pole as an instantaneous airgap. Assigning (block 160) the airgap to each corresponding rotor pole enables the controller 52 to monitor and track the airgap of each rotor pole in addition to statistics (e.g., the absolute maximum and minimum airgaps) of the entire rotor. The airgap for each rotor pole may be derived and assigned in real-time during operation of the generator system. Assigning (block 160) the airgaps to the corresponding rotor poles may decrease maintenance and/or replacement time and costs by monitoring the condition of the rotor poles. In some embodiments, assigning (block 160) the airgaps to the corresponding rotor poles enables the controller 52 to determine (block 166) the rotor shape in real-time during operation of the generator system 10. The controller 52 may display (block 168) the rotor shape and/or instantaneous airgaps on the user interface as a graphical representation (e.g., chart, circular plot, graphical model).

Figure 7:
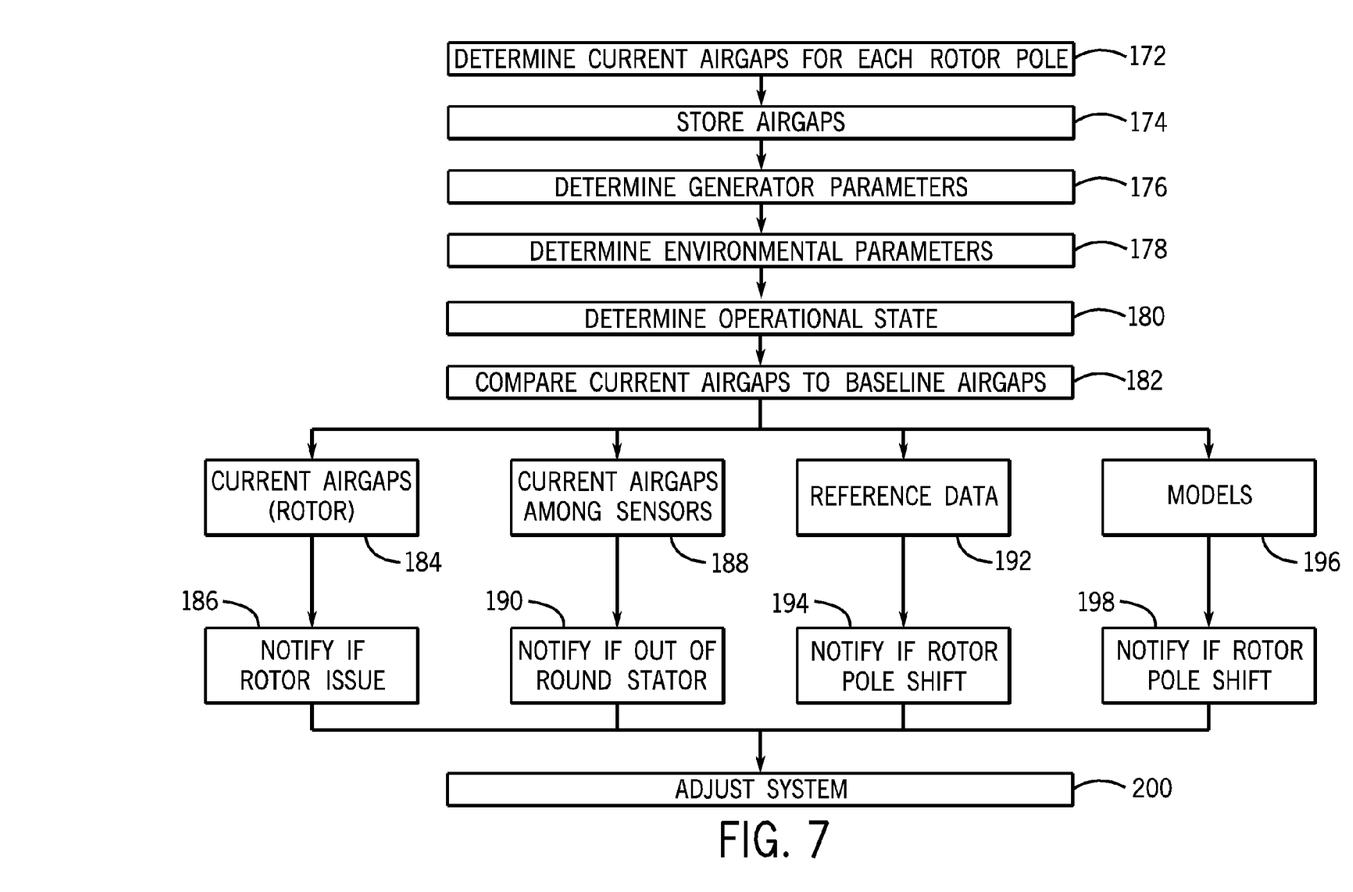
FIG. 7 is a flowchart of an embodiment of a process to monitor the instantaneous airgaps of the rotor poles.

FIG. 7 is a flowchart of an embodiment of a process 170 for monitoring the generator system 10 and comparing the plurality of instantaneous airgaps, for example, to baseline airgaps. The process 170 may be implemented by using computer instructions stored in a non-transitory machine-readable medium, such as the memory 128 of the controller 52. The airgap comparison system 134 and/or airgap modeling system 136 may implement the process 170.

The process 170 may determine (block 172) the instantaneous airgap for each rotor pole. In some embodiments, the controller 52 may determine the instantaneous airgap for each rotor pole using the process 150 of FIG. 6. As discussed above, the instantaneous airgap for each rotor pole may be determined based on the signals from one or more proximity sensors. The instantaneous airgaps may be stored (block 174) in memory as reference data. The instantaneous airgaps may be categorized and indexed in memory based at least in part on the operational state of the generator system. The controller 52 may also determine (block 176) the generator parameters. The generator parameters may be sensed by sensors and/or received as user input. The generator parameters include, but are not limited to, rotor mass, rotor speed, field excitation status, circuit breaker status, load, load capacity, time of operation, and generator temperature. In some embodiments, the generator parameters may primarily affect the derived instantaneous airgap for each rotor pole. The controller 52 may also determine (block 178) the environmental parameters of the generator system 10. For example, the controller 52 may sense the air temperature, water temperature, ambient air pressure, and other environmental parameters of the generator system 10. In some embodiments, the environmental parameters may secondarily affect the derived airgap for each rotor pole.

Based at least in part on the generator and environmental parameters, the controller 52 may determine (block 180) the operational state of the generator system 10. In some embodiments, the controller 52 determines the operational state based on a fixed index of states defined in memory (e.g., states of Table 1). In some embodiments, the controller 52 may add operational states to the states defined in memory to produce a dynamic index of operational states corresponding to various generator and environmental parameters. For example, the controller 52 may derive a plurality of sub-operational states subsumed within State 1. In some embodiments, each sub-operational state may correspond to a relatively narrow range of rotor speeds (e.g., 45 to 50 percent, 50 to 55 percent) and to a particular range of water temperatures or other environmental parameter. Indeed, the controller 52 may dynamically update the existing states, derive new states, or derive new sub-states for a specific installation of the system 10.

The process 170 may compare (block 182) the instantaneous airgap for each rotor pole to baseline airgaps. As mentioned above, the baseline airgaps are correlative to the operational state determined in block 180 or to a similar operational state. In some embodiments, the baseline airgaps may be the instantaneous airgaps corresponding to adjacent or nearby rotor poles. In some embodiments, the baseline airgaps are based at least in part on reference data (e.g., previously measured airgaps) stored in memory corresponding to each rotor pole, adjacent rotor poles, and/or nearby rotor poles. Moreover, in some embodiments, the baseline airgaps are based at least in part on statistics and/or models (e.g., learning models) produced with the reference data and operational state data. The controller 52 may compare the instantaneous airgap for each rotor pole with one or more baseline airgaps as shown in blocks 184, 188, 192, and 196.

In blocks 184 and 188, the baseline airgaps are different sets of instantaneous airgaps. In block 184, the instantaneous airgaps from a proximity sensor for a rotation are compared to other instantaneous airgaps from the same proximity sensor. In some embodiments, the controller 52 compares the absolute maximum instantaneous airgap with the absolute minimum instantaneous airgap. The difference may be used to determine the bounds of the rotor shape. In some embodiments, the controller 52 compares the instantaneous airgap of a first rotor pole with the instantaneous airgap of rotor poles adjacent and/or nearby (e.g., within 5, 7, or 9 rotor poles) to the first rotor pole. Differences between instantaneous airgaps of each rotor pole and adjacent and/or nearby rotor poles may be used to determine the rotor shape as sensed by the proximity sensor. The controller 52 may notify (block 186) the user of a rotor issue (e.g., out of round rotor) if the difference between the absolute maximum and absolute minimum is greater than a threshold (e.g., 5 to 15 percent difference). The controller 52 may notify (block 186) the user of a rotor issue (e.g., rotor pole shift) if the difference between the instantaneous airgaps of a rotor pole and the adjacent and/or nearby rotor poles is greater than a threshold (e.g., 0.01 to 20 percent difference). In block 188, the instantaneous airgaps from a proximity sensor for a rotation are compared to instantaneous airgaps from another proximity sensor for the same rotation. The controller 52 may compare the average airgap for all of the rotor poles as derived from a first proximity sensor with the average airgap for all of the rotor poles as derived from a second proximity sensor. The controller 52 may notify (block 190) the user that the stator is out of round if the difference is greater than a threshold (e.g., 0.01 to 30 percent difference).

In block 192, the baseline airgaps are from the reference data. The controller 52 may compare the instantaneous airgap for each rotor pole with reference data corresponding to the respective rotor pole in the same or similar operational state. The controller 52 may notify (block 194) the user that a rotor pole has shifted if the difference between the instantaneous airgap and reference data for the rotor pole is greater than a threshold (e.g., 0.01 to 20 percent difference). In some embodiments, the controller 52 may compare the instantaneous airgap for each rotor pole with reference data corresponding to adjacent and/or nearby rotor poles. Changes in the difference between airgaps of each rotor pole and adjacent and/or nearby rotor poles may indicate the rotor pole shifts and changes in the rotor shape. In block 196, the baseline airgaps are models based at least in part on the reference data and operational state. The controller 52 may compare the instantaneous airgap for each rotor pole with the model or predicted airgap from a model to determine a difference. In some embodiments, the controller 52 may compare the instantaneous airgap for each rotor pole with models based on reference data. The controller 52 may notify (block 198) the user that the respective rotor pole has shifted if the comparison with the model indicates the rotor pole is beyond a statistical threshold (e.g., 2 standard deviations of the reference airgap) or beyond a percentage threshold (e.g., 0.01 to 20 percent difference) with a predicted airgap. In some embodiments, the controller 52 may adjust (block 200) the generator system 10 in response to the comparisons of blocks 184, 188, 192, and 196. The adjustment may cause subsequent comparisons of the instantaneous airgaps with the baseline airgaps to be within thresholds.

Figure 8:
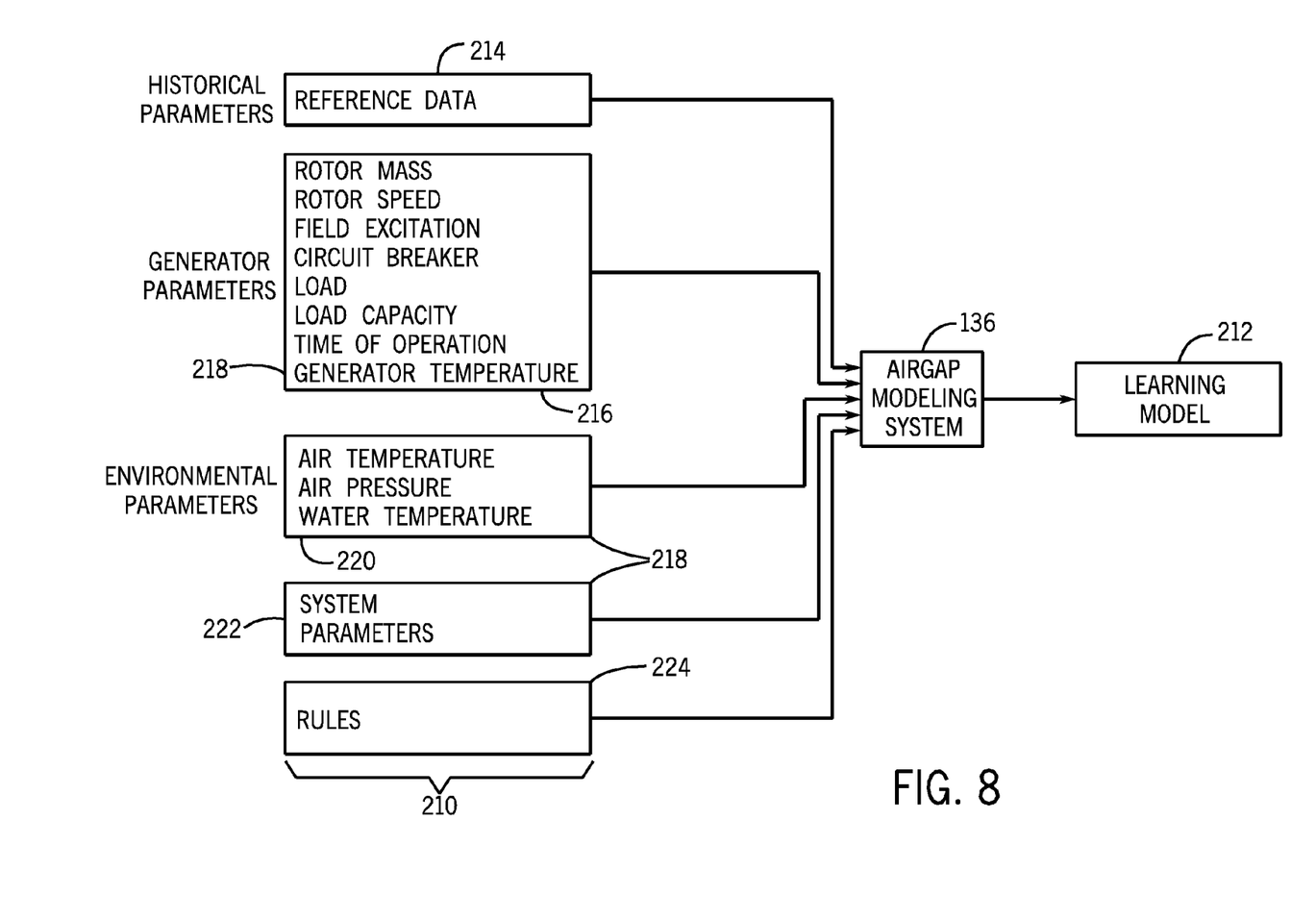
FIG. 8 is a block diagram of an embodiment of a airgap modeling system.

FIG. 8 is a block diagram of an embodiment of the airgap modeling system 136 depicting the transformation of inputs 210 into the learning model 212 used to produce baseline airgaps for each rotor pole. By using the inputs 210 to derive the learning model 212, the airgap modeling system 136 may enable an accurate prediction of the airgap for each rotor pole at any operational state, even if the controller 52 has not previously recorded airgaps of the generator system 10 at a particular operational state. The learning model 212 enables the prediction of the instantaneous airgap for each rotor pole based on the historical parameters 214 and a plurality of conditions 216 of the generator system 10. The historical parameters 214 of the generator system 10 includes the reference data (e.g., previously derived airgaps) for each rotor pole. Each combination of generator parameters 218, environmental parameters 220, and system parameters 222 may produce a separate operational state. The generator parameters 218 may include, but are not limited to, the rotor mass, rotor speed, field excitation status, circuit breaker status, load, load capacity, operational duration, and generator temperature. The environmental parameters may include, but are not limited to, the air temperature, air pressure, and water temperature. The system parameters 222 may include the efficiency of the generator system, friction losses, the age of the generator system, adjustments to the rotor or stator, known maintenance factors, or other factors. The historical parameters 214 may include the operational state of the generator system 10 corresponding to at least some of the previously derived airgaps (e.g., the reference data). The historical parameters 214 enable the airgap modeling system 136 to track trends of how the airgap for each rotor pole is affected by different conditions 216.

Rules 224 may provide a framework for the airgap modeling system 136 to transform the inputs 210 into the learning model 212. The rules 224 may include "if . . . then . . . " rules with the "if" portion set as an antecedent condition, and the "then" portion set as a consequent of the antecedent condition. The rules may also include fuzzy logic rules, expert system rules (e.g., forward chained expert systems, backward chained expert systems), recursive rules (e.g., Prolog rules), Bayesian inference rules, dynamic logic rules (e.g., modal logic), neural network rules, genetic algorithm rules, or a combination thereof. The rules can be derived through consultation with one or more experts in the field, or automatically, such as by using machine learning techniques (e.g., reinforcement learning, decision tree learning, inductive logic programming, neural network training, clustering, support vector machine).

The airgap modeling system 136 may adapt to changing conditions 216 and historical parameters 214. As a result, the learning model 212 may be subject to change during operation. As the generator system 10 operates in varied operational states, the predicted instantaneous airgap produced by the learning model 212 may increase in accuracy. In some embodiments, some of the historical parameters 214 and/or conditions 216 may be edited (e.g., removed, revised, added) by a user to improve the predicted airgap. In some embodiments, the airgap modeling system 136 may produce the learning model with predicted airgaps after the airgap modeling system 136 has monitored and modeled the generator system for a duration of time (e.g., 10, 20, 50, 100, 1000 hours).

Technical effects of the invention include the gathering of derived airgaps of each rotor pole and corresponding operational states of the generator system. The gathered airgaps and operational states may then be used to derive a statistics, models, and/or learning models for comparison. In some embodiments, a rule engine is communicatively coupled to the memory where the current derived airgaps and reference data is stored. The rules in the rule engine may be edited by using a rule editor. The learning model may include a prediction of instantaneous airgap for each rotor pole, an indication of a trend or shift in the status of the generator system, or an indication of a future event regarding the airgap for each rotor pole, or a combination thereof, suitable for improving and/or optimizing the airgap monitoring system.

The invention claimed is:

1. A generator airgap monitoring system, comprising:
    a first proximity sensor disposed in a first location of a stator and configured to transmit a first signal representative of a first distance between the first proximity sensor and a plurality of rotor poles of a rotor;
    a controller communicatively coupled to the first proximity sensor, wherein the controller is configured to derive a first plurality of instantaneous airgaps based on the first signal and to determine a difference between a first instantaneous airgap of the first plurality of instantaneous airgaps and a second instantaneous airgap of the first plurality of instantaneous airgaps, wherein the first plurality of instantaneous airgaps comprises a first plurality of measurements of airgaps between the stator and the plurality of rotor poles when the rotor is rotating, the first instantaneous airgap comprises a first measurement, derived by using the first proximity sensor, of a first airgap between the stator and a first rotor pole of the plurality of rotor poles, and the second instantaneous airgap comprises a second measurement, derived by using the first proximity sensor, of a second airgap between the stator and a second rotor pole of the plurality of rotor poles.

2. The generator airgap monitoring system of claim 1, wherein the first proximity sensor is configured to transmit a rotational signal representative of a first traverse of an indicator of the rotor, and the controller is configured to assign each instantaneous airgap of the first plurality of instantaneous airgaps to a respective rotor pole of the plurality of rotor poles based at least in part on the rotational signal.

3. The generator airgap monitoring system of claim 2, comprising a second proximity sensor disposed in a second location of the stator and configured to transmit a second signal representative of a second distance between the second proximity sensor and the plurality of rotor poles, wherein the controller is communicatively coupled to the second proximity sensor, the controller is configured to derive a second plurality of instantaneous airgaps based on the second signal, and the controller is configured to assign each instantaneous airgap of the second plurality of instantaneous airgaps to the respective rotor pole of the plurality of rotor poles based at least in part on the rotational signal.

4. The generator airgap monitoring system of claim 1, wherein the second instantaneous airgap is adjacent the first instantaneous airgap.

5. The generator airgap monitoring system of claim 1, wherein the controller is configured to derive a plurality of airgap baselines based on at least one operational state.

6. The generator airgap monitoring system of claim 1, wherein the controller is configured to derive a learning model to compare with the first plurality of instantaneous airgaps, wherein the learning model comprises a heuristic model, a neural network, an expert system, a genetic algorithm, or fuzzy logic, or a combination thereof.

7. The generator airgap monitoring system of claim 1, wherein the controller is configured to derive a learning model based on at least one operational state and to use the learning model to determine if the rotor and stator are operating within a threshold.

8. The generator airgap monitoring system of claim 1, wherein the controller is configured to derive a geometry of the rotor based at least in part on the first plurality of instantaneous airgaps.

9. A method of monitoring a generator system, comprising:
    sensing a first plurality of instantaneous airgaps between a plurality of rotor poles and a stator of the generator system by using a first proximity sensor disposed in the stator;
    assigning each instantaneous airgap of the first plurality of instantaneous airgaps to a respective rotor pole of the plurality of rotor poles; and
    determining a difference between each assigned instantaneous airgap of the first plurality of instantaneous airgaps and a baseline airgap for the respective rotor pole.

10. The method of monitoring the generator system of claim 9, comprising determining the baseline airgap, wherein the baseline airgap for the respective rotor pole is based at least in part on an operational state of the rotor.

11. The method of monitoring the generator system of claim 10, wherein determining the baseline airgap is based at least in part on an ambient air temperature, an ambient water temperature, or a combination thereof.

12. The method of monitoring the generator system of claim 10, wherein determining the baseline airgap for the respective rotor pole is based at least in part on one or more assigned instantaneous airgaps of the first plurality of instantaneous airgaps.

13. The method of monitoring the generator system of claim 9, comprising storing the first plurality of instantaneous airgaps as reference data, wherein the baseline airgap is based at least in part on the reference data.

14. The method of monitoring the generator system of claim 13, comprising:
    sensing a second plurality of instantaneous airgaps between the plurality of rotor poles and the stator of the generator system using a second proximity sensor;
    assigning each instantaneous airgap of the second plurality of instantaneous airgaps to the respective rotor pole of the plurality of rotor poles; and
    storing the second plurality of instantaneous airgaps as reference data.

15. The method of monitoring the generator system of claim 13, wherein the baseline airgap is based at least in part on a statistical model and the reference data.

16. The method of monitoring the generator system of claim 13, wherein the baseline airgap is based at least in part on the output of a learning model, wherein the learning model comprises a heuristic model, a neural network, an expert system, a genetic algorithm, or fuzzy logic, or a combination thereof.

17. The method of monitoring the generator system of claim 9, comprising producing an operator-perceptible notification if the difference is greater than a threshold.

18. A generator system, comprising:
    a non-transitory tangible computer-readable medium comprising executable code, the executable code comprising instructions for:
        sensing a plurality of instantaneous airgaps between a plurality of rotor poles and a stator of a generator using a proximity sensor disposed in the stator;

assigning each instantaneous airgap of the plurality of instantaneous airgaps to a respective rotor pole of the plurality of rotor poles; and determining a plurality of differences corresponding to the difference between each assigned instantaneous airgap and a baseline airgap for the respective rotor pole.

19. The generator system of claim 18, comprising a user interface configured to display visualizations representative of the plurality of differences.

20. The generator system of claim 18, wherein the generator system comprises a hydro generator.

* * * * *

UNITED STATES PATENT AND TRADEMARK OFFICE
CERTIFICATE OF CORRECTION

PATENT NO. : 8,912,766 B2  
APPLICATION NO. : 13/763612  
DATED : December 16, 2014  
INVENTOR(S) : Grant et al.

It is certified that error appears in the above-identified patent and that said Letters Patent is hereby corrected as shown below:

In the specification

Column 5, Line 19, delete "10 nm," and insert -- 10 μm, --, therefor.

Column 7, Line 6, delete "poles 38" and insert -- poles 26 --, therefor.

Signed and Sealed this  
Twenty-first Day of April, 2015

Michelle K. Lee  
*Director of the United States Patent and Trademark Office*